United States Patent
Lipchuk et al.

(10) Patent No.: US 10,203,975 B2
(45) Date of Patent: Feb. 12, 2019

(54) VIRTUAL MACHINE TEMPLATE MANAGEMENT

(71) Applicant: Red Hat Israel, Ltd., Raanana (IL)

(72) Inventors: Maor Lipchuk, Tel Aviv (IL); Daniel Erez, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 61 days.

(21) Appl. No.: 14/288,570

(22) Filed: May 28, 2014

(65) Prior Publication Data
US 2015/0347165 A1 Dec. 3, 2015

(51) Int. Cl.
*G06F 8/61* (2018.01)
*G06F 9/455* (2018.01)

(52) U.S. Cl.
CPC .......... *G06F 9/45558* (2013.01); *G06F 8/63* (2013.01); *G06F 2009/45562* (2013.01)

(58) Field of Classification Search
CPC .............. G06F 9/45558; G06F 3/065
USPC ........................................................ 718/1
See application file for complete search history.

(56) References Cited

U.S. PATENT DOCUMENTS

| | | | |
|---|---|---|---|
| 7,093,086 B1* | 8/2006 | van Rietschote | G06F 11/1438 711/161 |
| 8,417,938 B1* | 4/2013 | Considine | G06F 9/5088 713/151 |
| 8,538,919 B1* | 9/2013 | Nielsen | G06F 9/5077 380/277 |
| 8,788,379 B1* | 7/2014 | Sirota | G06Q 30/04 705/35 |
| 2007/0300220 A1* | 12/2007 | Seliger | G06F 8/61 718/1 |
| 2008/0244028 A1* | 10/2008 | Le | G06F 3/0607 709/208 |
| 2009/0260007 A1* | 10/2009 | Beaty | G06F 9/5077 718/1 |
| 2009/0300076 A1* | 12/2009 | Friedman | G06F 11/3664 |
| 2010/0257523 A1* | 10/2010 | Frank | G06F 9/45558 718/1 |
| 2011/0296412 A1* | 12/2011 | Banga | G06F 9/5027 718/1 |
| 2012/0017027 A1* | 1/2012 | Baskakov | G06F 12/08 711/6 |
| 2012/0266161 A1* | 10/2012 | Baron | G06F 9/45558 718/1 |
| 2012/0271935 A1* | 10/2012 | Moon | G06F 9/5094 709/224 |
| 2012/0272236 A1* | 10/2012 | Baron | G06F 9/4416 718/1 |

(Continued)

OTHER PUBLICATIONS

"StorageLIveMigration", www.ovirt.org, pp. 1-12 http://www.ovirt.org/Features/Design/StorageLiveMigration (last accessed May 30, 2014).

*Primary Examiner* — Wei Y Zhen
*Assistant Examiner* — Brahim Bourzik
(74) *Attorney, Agent, or Firm* — Lowenstein Sandler LLP

(57) ABSTRACT

Systems and methods for managing virtual machine templates. An example method may comprise: identifying, by a computer system, a virtual machine snapshot represented by a volume chain comprising one or more copy-on-write (COW) volumes; and creating, based on the virtual machine snapshot, a virtual machine template represented by a new COW volume, wherein the new COW volume comprises data from the COW volumes of the volume chain.

9 Claims, 4 Drawing Sheets

(56) References Cited

U.S. PATENT DOCUMENTS

| | | | |
|---|---|---|---|
| 2012/0278573 A1 | 11/2012 | Colbert et al. | |
| 2013/0332920 A1* | 12/2013 | Laor | G06F 9/45558 718/1 |
| 2014/0146055 A1* | 5/2014 | Bala | G06F 11/1402 345/501 |
| 2014/0325170 A1* | 10/2014 | Aswathanarayana | G06F 9/45558 711/162 |
| 2015/0074536 A1* | 3/2015 | Varadharajan | G06F 3/0481 715/734 |
| 2015/0177997 A1* | 6/2015 | Warszawski | G06F 3/0617 711/162 |

* cited by examiner

VIRTUAL MACHINE TEMPLATE MANAGEMENT

TECHNICAL FIELD

The present disclosure is generally related to virtualized computer systems, and is more specifically related to virtual machine template management.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for virtual machine template management, including template creation and export.

A virtual machine template provides a functional shortcut allowing creation of multiple new virtual machines based on an existing virtual machine, bypassing repeating operations of operating system installation and configuration. In common virtualization environment implementations, in order to create a template, an administrator should install and configure a virtual machine, stop the virtual machine, and create a template represented by a virtual machine disk image, which will be used as a backing image for subsequently created virtual machines that are based on that template.

Creating a template may require a considerable downtime, thus disrupting the normal operation of the virtual machine. The present disclosure addresses the above noted and other deficiencies by providing a method for creating and/or exporting a virtual machine template based on a snapshot of the virtual machine, thus eliminating the virtual machine downtime that would otherwise be needed for creating a template based on the virtual machine disk images. Various aspects of the above referenced methods and systems are described in details herein below by way of examples, rather than by way of limitation.

Figure 1:
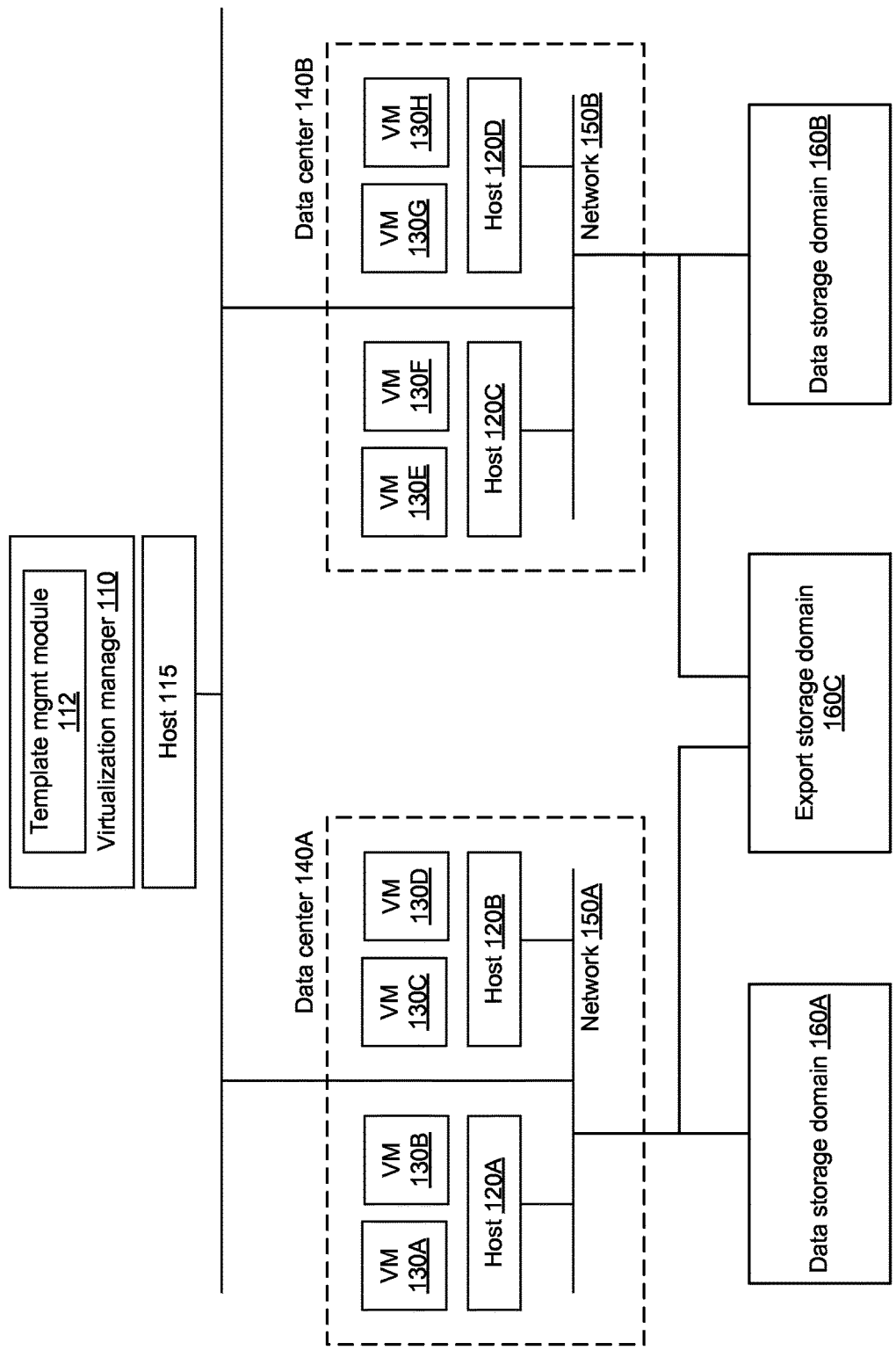
FIG. 1 depicts a high-level component diagram of one illustrative example of a distributed computer system representing a virtualized environment operating in accordance with one or more aspects of the present disclosure.

FIG. 1 depicts a high-level component diagram of one illustrative example of a distributed computer system representing a virtualized environment. In the illustrative example of FIG. 1, the distributed computer system comprises a virtualization manager 110 and a plurality of host computer systems 120A-120D grouped into one or more logical groups which may be also referred to as "data centers" 140A-140B. Virtualization manager 110 refers to one or more software modules being executed by a host computer system 115 for centralized management of the virtualized environment. Virtualization manager 110 may comprise various interfaces, including administrative interface, reporting interface, and/or application programming interface (API) to communicate to host computers 120A-120D of the managed virtualized environment, as well as to user portals, databases, directory servers and various other components which are omitted from FIG. 1 for clarity.

Each of host computer systems 115, 120A-120D may comprise one or more processors communicatively coupled to memory devices and input/output (I/O) devices, as described in more details herein below with references to FIG. 4.

Each of host computer systems 120A-120D may run a plurality of virtual machines 130A-130H, by executing a hypervisor to abstract the physical layer, including processors, memory, and I/O devices, and present this abstraction to the virtual machines as virtual devices. A virtual machine 130 may execute a guest operating system which may utilize the underlying virtual devices, including virtual processors, virtual memory, and virtual I/O devices. One or more applications may be running on virtual machine 130 under the guest operating system.

In certain implementations, host computer systems 120A-120D may be grouped into one or more logical groups which may be also referred to as "data centers" 140A-140B. A data center may represent the highest level of abstraction in the virtualization model. Each data center 140 may be communicatively coupled, via a network 150, to one or more storage domains 160, including data storage domains 160A, 160B and an export storage domain 160C.

Data storage domains 160A, 160B may store disk images of virtual machines 130. In certain implementations, a data storage domain cannot be shared across multiple data centers. Export storage domain 160C may provide a temporary storage repository to be used for copying virtual machines disk images, snapshots, and templates between data centers.

In accordance with one or more aspects of the present disclosure, virtualization manager 110 may comprise a template management module 112 for creating and exporting virtual machine templates, as described in more details herein below.

A virtual machine template provides a functional shortcut allowing creation of multiple new virtual machines based on an existing virtual machine, bypassing repeating operations of operating system installation and configuration. In common virtualization environment implementations, in order to create a template, an administrator should install and configure a virtual machine, stop the virtual machine, and create a template represented by a virtual machine disk image, which will be used as a backing image for subsequently created virtual machines that are based on that template. Thus, creating a template may require a considerable downtime, thus disrupting the normal operation of the virtual machine.

In accordance with one or more aspects of the present disclosure, a virtual machine template may be created based on a snapshot of the virtual machine, rather than based on disk images of a stopped virtual machine, as described in more details herein below.

Figure 2:
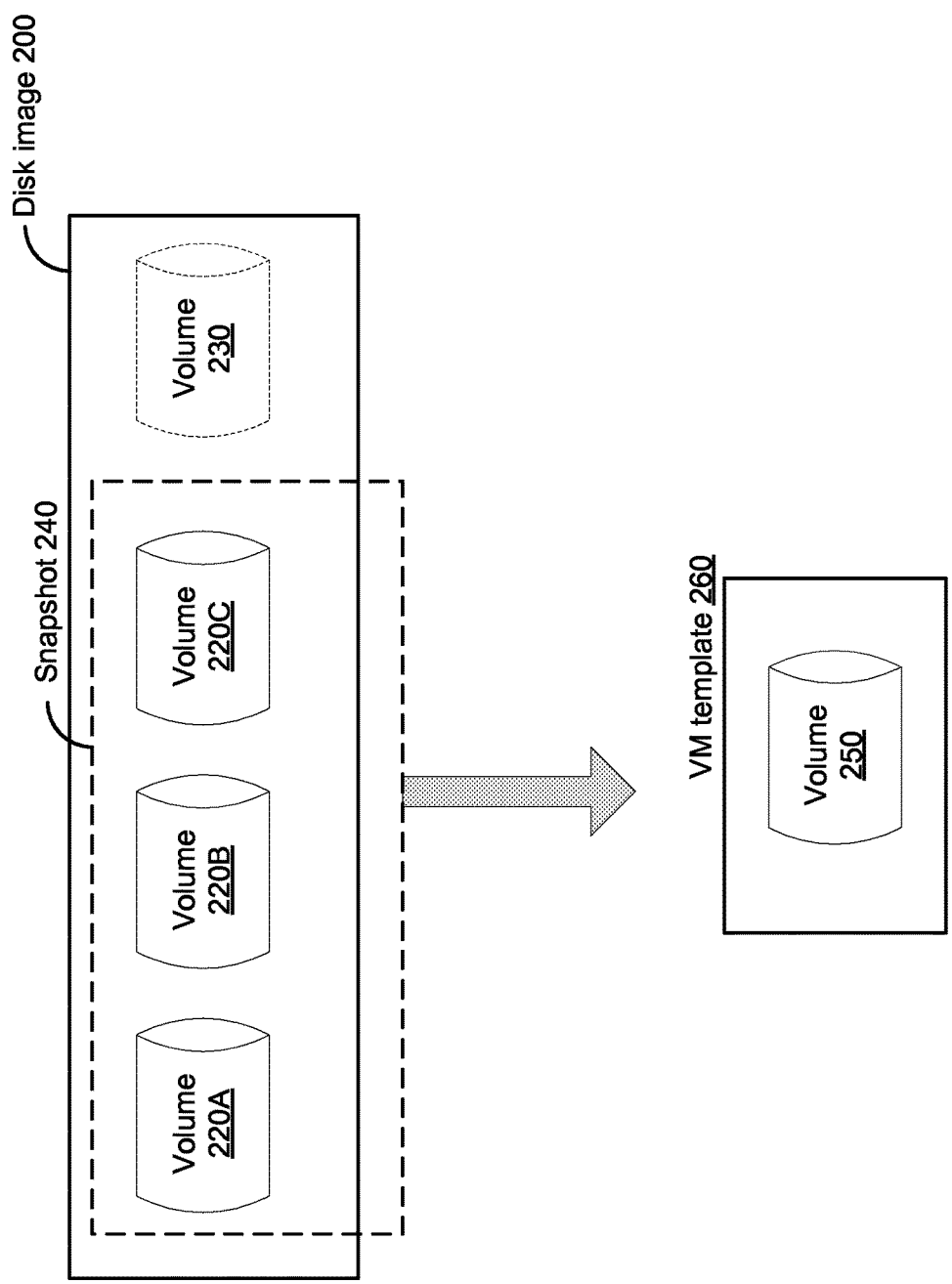
FIG. 2 schematically illustrates creating a virtual machine template based on a virtual machine snapshot represented by a disk image comprising a chain of volumes, in accordance with one or more aspects of the present disclosure.

FIG. 2 schematically illustrates creation of a virtual machine template based on a virtual machine snapshot represented by a disk image comprising a chain of volumes. Referring to FIG. 2, a disk image may be represented by a volume chain (shown as disk image 200) comprising one or more copy-on-write (COW) volumes, such as volumes 220A, 220B, and 220C (which may also be referred to as "layers"). From the perspective of a virtual machine, these volumes appear as a single disk image, as the hypervisor presents the virtual disk to a virtual machine and implements the associated disk read-write operations.

Initially, a virtual machine disk image may only comprise one raw or COW volume, which may be made read-only before the first boot of the virtual machine. An attempt to write to a disk by a virtual machine may trigger adding a new COW volume ("layer") to the volume chain. The newly created volume may be made writable, and may only store disk blocks or files which have been modified or newly created by the virtual machine after the previous volume ("layer") has been made read-only. One or more volumes may be added to the volume chain during the lifetime of the virtual machine. Adding a new COW volume may be triggered by making the previous volume read-only (e.g., responsive to receiving a command via an administrative interface).

The above described layered disk image structure may be utilized for creating virtual machine snapshots. A virtual machine snapshot may be viewed as a storage function allowing creation of a restore point of a virtual machine's operating system, applications, and data at a certain point in time. A snapshot saves the data currently present in a virtual machine hard disk image as a read-only volume and allows for a recovery to the disk image state as it existed at the time the snapshot was taken.

In an illustrative example, a virtual machine snapshot may be created (e.g., responsive to receiving a command via an administrative interface or an API interface) by causing the most recent volume 220C in volume chain to become read-only, and adding a new COW volume 230 to a volume chain (shown as disk image 200). Since the most recent volume 220C in the volume chain has been made read-only, all write actions performed after the snapshot is taken are written to the newly added COW volume 230. Thus, the snapshot comprising the layered read-only volumes reflects the state of the virtual machine disk image at the time of snapshot creation (which may be defined as the time of making read-only the most recent volume in the volume chain).

Newly created COW volume 230 initially only contains COW metadata (e.g., a reference to the previous volume in the volume chain, a volume format identifier, etc.). Data that is created by the virtual machine operation after the snapshot is taken is written to the newly created COW volume 230. When the virtual machine modifies the data that exists in one of read-only COW volumes 230, the data is read from the read only COW volume 230, and written into the newly created COW volume 230. The virtual disk device implemented by the hypervisor locates the data by accessing, transparently to the virtual machine, each volume of the chain of volumes comprised by the snapshot, starting from the most recently added volume.

In accordance with one or more aspects of the present disclosure, a virtual machine template may be created based on a virtual machine snapshot rather than based on disk images of a stopped virtual machine. In an illustrative example, template management module 112 may receive, via an administrative portal interface or an API, a message identifying a snapshot to be used for creating the virtual machine template. In certain implementations, a snapshot may be identified by an identifier of the most recently added volume among the volumes to be comprised by the snapshot. In an illustrative example, a snapshot 240 identified by an identifier of volume 230 comprises volumes 220A, 220B, and 220C.

Responsive to receiving the message identifying the snapshot, template management module 112 may create a virtual machine template 260 comprising a newly created volume 250 representing a flattened image of the volumes comprised by the snapshot. "Flattened" image herein shall refer to a newly-created self-contained image populated with the data from one or more volumes of an image chain, such that the newly created image no longer depends on the volumes of the image chain. Flattening a disk image may comprise copying the initial raw or COW volume to a newly created volume, and then "playing back" the history of disk image modifications which are stored in one or more chained COW volumes ("layers"), i.e., applying, to the initial volume, all disk modifications operations stored by the chained COW volumes. In the illustrative example of FIG. 2, a template represented by newly created volume 250 may be created based on the data stored by volumes 220A, 220B, and 220C.

In certain implementations, virtualization manager 110 may, before creating a template based on a snapshot, generalize the snapshot by removing certain deployment-specific information, such as, for example, system user names, passwords, time zone information, etc.

As the virtual machine associated with disk image 200 may be running during the snapshot creation and template creation operations, both operations may be performed without disrupting the functioning of the virtual machine. In certain implementations, a template based on a running virtual machine may be created in accordance with one or more aspects of the present disclosure, by causing virtualization manager 110 to create snapshot of the running virtual machine and then creating a virtual machine template based on the snapshot.

In an illustrative example, template management module 112 may create the virtual machine template in the data storage domain associated with the data center to which the virtual machine belongs. Alternatively, template management module 112 may create the virtual machine template in an export storage domain associated with the data center to which the virtual machine belongs, thus facilitating copying the template to a data storage domain of another data center. In certain implementations, virtualization manager 110 may, responsive to creating a virtual machine template in the export storage domain, copy the virtual machine template to a data storage domain associated with a data center which is different from the data center associated with the virtual machine which served as the basis for creating the template.

Figure 3:
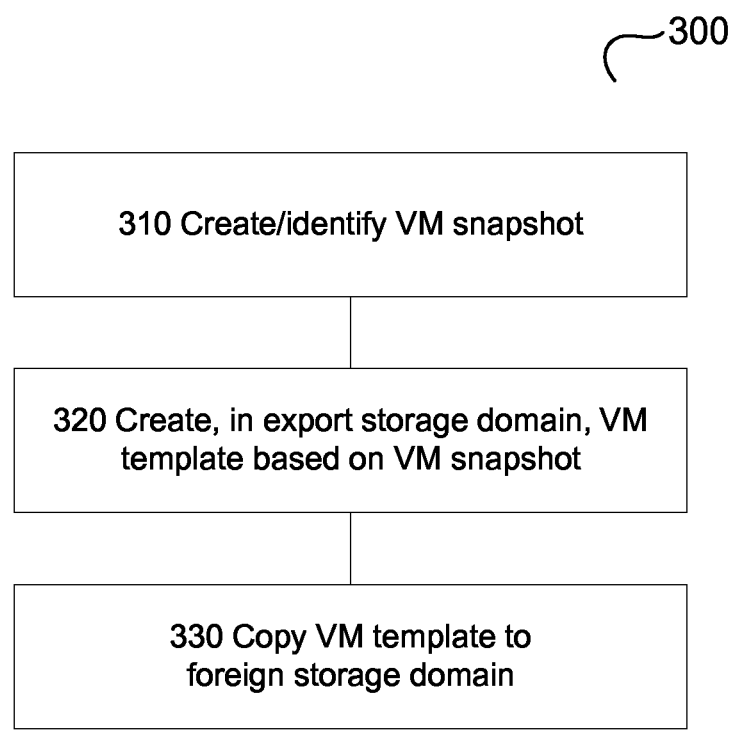
FIG. 3 depicts a flow diagram of a method for creating and/or exporting a virtual machine template based on a snapshot of the virtual machine, in accordance with one or more aspects of the present disclosure.

FIG. 3 depicts a flow diagram of one illustrative example of a method 300 for creating and/or exporting a virtual machine template based on a snapshot of the virtual machine, in accordance with one or more aspects of the present disclosure. Method 300 and/or each of its individual functions, routines, subroutines, or operations may be performed by one or more processors of the computer device (e.g., the computer system shown in FIG. 1) executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the computing device implementing the method for creating and/or exporting a virtual machine template based on a snapshot of the virtual machine in accordance with one or more aspects of the present disclosure may receive, via an administrative portal interface or an API, a message identifying a snapshot to be used for creating the virtual machine template. In certain implementations, the snapshot may be represented by a volume chain comprising one or more copy-on-write (COW) volumes. In an illustrative example, a snapshot may be identified by an identifier of the most recently added volume among the volumes to be comprised by the snapshot, as described in more details herein above.

In various illustrative examples, the identified virtual machine snapshot may be associated with a stopped or running virtual machine.

In certain implementations, the computing device may generalize the virtual machine snapshot by removing certain deployment-specific information, such as, for example, system user names, passwords, time zone information, as described in more details herein above.

At block 320, the computing device may create, based on the virtual machine snapshot, a virtual machine template represented by a new COW volume comprising the data from the COW volumes of the volume chain. In certain implementations, the new COW volume may represent a flattened image of the COW volumes of the volume chain. "Flattened" image herein shall refer to a newly-created self-contained image populated with the data from one or more volumes of an image chain, such that the newly created image no longer depends on the volumes of the image chain. Flattening a disk image may comprise copying the initial raw or COW volume to a newly created volume, and then "playing back" the history of disk image modifications which are stored in one or more chained COW volumes ("layers"), i.e., applying, to the initial volume, all disk modifications operations stored by the chained COW volumes.

In an illustrative example, template management module 112 may create the virtual machine template in the data storage domain associated with the data center to which the virtual machine belongs. Alternatively, template management module 112 may create the virtual machine template in an export storage domain associated with the data center to which the virtual machine belongs, thus facilitating copying the template to a data storage domain of another data center, as described in more details herein above.

At block 330, the computing device may copy the virtual machine template to a data storage domain associated with a data center which is different from the data center associated with the virtual machine which served as the basis for creating the template, as described in more details herein above. Upon completing the operations referenced by block 330, the method may terminate.

Figure 4:
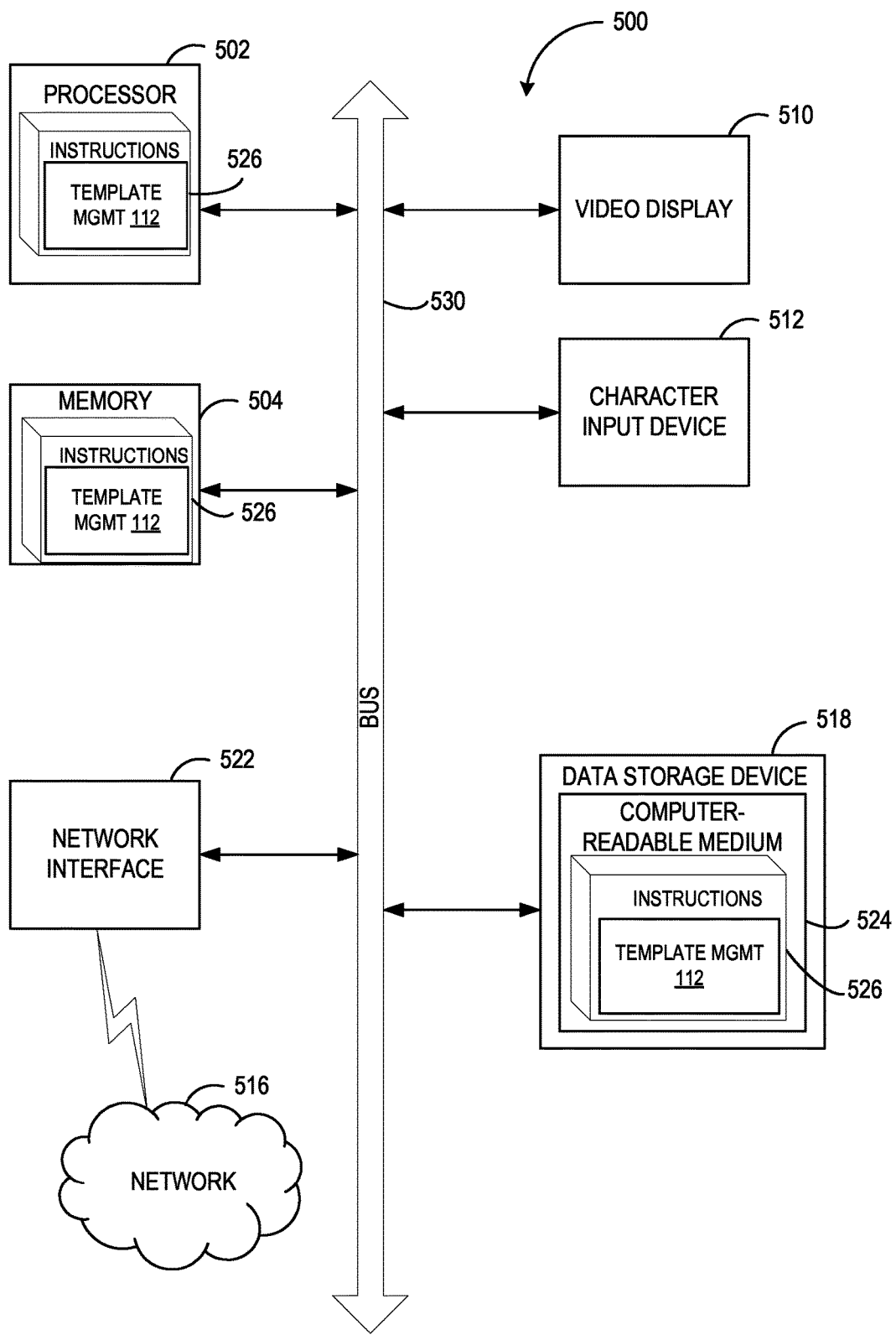
FIG. 4 depicts a block diagram of an illustrative computing device operating in accordance with the examples of the present disclosure.

FIG. 4 illustrates a component diagram of an example computing device 500 within which a set of instructions, for causing the computing device to perform any one or more of the methods discussed herein, may be executed. In various illustrative examples, computing device 500 may implement the above described functionality of host computer systems 115, 120 of FIG. 1.

"Physical processor" or "processor" herein shall refer to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

Example computing device 500 may be connected to other computing device in a LAN, an intranet, an extranet, or the Internet. The computing device may operate in the capacity of a server or a client computing device in client-server network environment, or as a peer computing device in a peer-to-peer (or distributed) network environment. The computing device may be a provided by a personal computer (PC), a tablet PC, a set-top box (STB), a Personal Digital Assistant (PDA), a cellular telephone, or any computing device capable of executing a set of instructions (sequential or otherwise) that specify operations to be performed by that computing device. Further, while only a single computing device is illustrated, the term "computing device" shall also be taken to include any collection of computing devices that individually or jointly execute a set (or multiple sets) of instructions to perform any one or more of the methodologies discussed herein.

Exemplary computing device 500 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose processing devices such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions 526 for performing the operations and functions discussed herein.

Computing device 500 may further include a network interface device 522, a video display unit 510, and a character input device 512 (e.g., a keyboard).

Data storage device 518 may include a computer-readable storage medium 524 on which is stored one or more sets of instructions 526 embodying any one or more of the methodologies or functions described herein. Instructions 526 may also reside, completely or at least partially, within main memory 504 and/or within processor 502 during execution thereof by computing device 500, main memory 504 and processor 502 also constituting computer-readable storage media. Instructions 526 may further be transmitted or received over network 516 via network interface device 522.

In certain implementations, instructions 526 may include instructions for a method of creating and/or exporting a virtual machine template based on a snapshot of the virtual machine, which may correspond to method 300, and may be performed by template management module 112 of FIG. 1. While computer-readable storage medium 524 is shown in the example of FIG. 4 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computing device, or similar electronic computing device, that manipulates and transforms data represented as physical (e.g., electronic) quantities within the computing device's registers and memories into other data similarly represented as physical quantities within the computing device memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

The invention claimed is:

1. A method, comprising:
 identifying a virtual machine disk image represented by a volume chain comprising one or more copy-on-write (COW) volumes;
 creating, by a processor, a virtual machine snapshot by making a most recently added COW volume of the volume chain read-only and appending a first read-write COW volume to the volume chain, wherein the most recently added COW volume comprises a plurality of modifications to the virtual machine disk image, and wherein the plurality of modifications occur since appending a last COW volume to the volume chain,
 wherein the virtual machine snapshot is created in a first data storage domain in a first data center while a virtual machine is running:
 responsive to receiving a message comprising an identifier, identifying, in view of the identifier, a first COW volume of the one or more COW volumes in the volume chain; copying an initial COW volume of the virtual machine snapshot to a template volume; generating a flattened image in the template volume by applying disk modification operations starting from the initial COW volume up to the first COW volume of the one or more COW volumes in the volume chain;

removing deployment-specific information from the flattened image to generate a modified flattened image;

creating, using the modified flattened image in the template volume, a virtual machine template in an export storage domain; and exporting the virtual machine template from the export storage domain to a second data storage domain in a second data center while the virtual machine is running, wherein the first data storage domain and the second data storage domain are not shared across the first data center and the second data center.

2. The method of claim 1, further comprising:
generalizing the virtual machine snapshot.

3. A system comprising:
a memory; and
a processor, operatively coupled to the memory, the processor configured to:
identify a virtual machine disk image represented by a volume chain comprising one or more copy-on-write (COW) volumes;
create a virtual machine snapshot by making a most recently added COW volume of the volume chain read-only and appending a first read-write COW volume to the volume chain, wherein the most recently added COW volume comprises a plurality of modifications, and wherein the plurality of modifications occur to the virtual machine disk image since appending a last COW volume to the volume chain,
wherein the virtual machine snapshot is created in a first data storage domain in a first data center while a virtual machine is running; responsive to receiving a message comprising an identifier, identify, in view of the identifier, a first COW volume of the one or more COW volumes in the volume chain; copy an initial COW volume of the virtual machine snapshot to a template volume; generate a flattened image in the template volume by applying disk modification operations starting from the initial COW volume up to the first COW volume of the one or more COW volumes in the volume chain;
remove deployment-specific information from the flattened image to generate a modified flattened image;
create, using the modified flattened image in the template volume, a virtual machine template in an export storage domain; and export the virtual machine template from the export storage domain to a second data storage domain in a second data center while the virtual machine is running, wherein the first data storage domain and the second data storage domain are not shared across the first data center and the second data center.

4. A computer-readable non-transitory storage medium comprising executable instructions that, when executed by a processor, cause the processor to:
identify, by the processor, a virtual machine disk image represented by a volume chain comprising one or more copy-on-write (COW) volumes;
create a virtual machine snapshot by making a most recently added COW volume of the volume chain read-only and appending a first read-write COW volume to the volume chain, wherein the most recently added COW volume comprises a plurality of modifications, and wherein the plurality of modifications occur to the virtual machine disk image since appending a last COW volume to the volume chain,
wherein the virtual machine snapshot is created in a first data storage domain in a first data center while a virtual machine is running; responsive to receiving a message comprising an identifier, identify, in view of the identifier, a first COW volume of the one or more COW volumes in the volume chain, wherein the first COW volume comprises an intermediate COW volume other than the most recently added COW volume in the volume chain; copy an initial COW volume of the virtual machine snapshot to a template volume; generate a flattened image in the template volume by applying disk modification operations starting from the initial COW volume up to the first COW volume of the one or more COW volumes in the volume chain;
remove deployment-specific information from the flattened image to generate a modified flattened image;
create, using the modified flattened image in the template volume, a virtual machine template in an export storage domain; and export the virtual machine template from the export storage domain to a second data storage domain in a second data center while the virtual machine is running, wherein the first data storage domain and the second data storage domain are not shared across the first data center and the second data center.

5. The computer-readable non-transitory storage medium of claim 4, further comprising executable instructions causing the processor to:
generalize the virtual machine snapshot.

6. The method of claim 1, wherein the deployment-specific information comprises one of a user name, a password, or a time zone.

7. The system of claim 3, wherein the virtual machine snapshot is generalized.

8. The system of claim 3, wherein the deployment-specific information comprises one of a user name, a password, or a time zone.

9. The computer-readable non-transitory storage medium of claim 4, wherein the deployment-specific information comprises one of a user name, a password, or a time zone.

* * * * *